United States Patent [19]

Lavin

[11] Patent Number: 4,876,733
[45] Date of Patent: Oct. 24, 1989

[54] METHOD FOR PERFORMING MORPHIC TRANSFORMATIONS ON IMAGE DATA IN A GENERAL PURPOSE COMPUTER

[75] Inventor: Mark A. Lavin, Mount Kisco, N.Y.

[73] Assignee: International Business Machines Corporation, Armonk, N.Y.J

[21] Appl. No.: 320,824

[22] Filed: Mar. 7, 1989

Related U.S. Application Data

[63] Continuation-in-part of Ser. No. 925,333, Oct. 31, 1986, abandoned.

[51] Int. Cl.⁴ .............................................. G06K 9/36
[52] U.S. Cl. ........................................ 382/27; 382/41
[58] Field of Search ................... 382/27, 41, 42, 48, 382/43, 49, 46, 54; 364/728

[56] References Cited

U.S. PATENT DOCUMENTS

| 4,003,024 | 1/1977 | Riganati et al. | 382/54 |
| 4,134,134 | 1/1979 | Lux | 382/43 |
| 4,167,728 | 9/1979 | Sternberg | 382/49 |
| 4,437,121 | 3/1984 | Taylor et al. | 382/46 |

*Primary Examiner*—Leo H. Boudreau
*Attorney, Agent, or Firm*—Terry J. Ilardi; Thomas P. Dowd

[57] ABSTRACT

A method for carrying out morphic transformations with minimal memory accesses by using a two step convolving sequence to form an intermediate image. The components of the intermediate image are used in a recursive process to provide the desired final convolution. The word resulting from this convolution is then used to access a morphic transformation table in a second memory access for table hookup. The two step convolution requires a total of only two memory reads and two memory writes.

7 Claims, 4 Drawing Sheets

FIG.1

|   | 1 | 1 | 1 | 0 |
|---|---|---|---|---|
| 0 | $a_1$ | $b_1$ | $c_1$ | 0 |
| 0 | $d_1$ | $e_1$ | $f_0$ | 1 |
| 1 | $g_1$ | $h_0$ | $i_0$ | 0 |
| 1 | 0 | 1 | 0 | 1 |

| $2^8$ | $2^5$ | $2^2$ |
|---|---|---|
| $2^7$ | $2^4$ | $2^1$ |
| $2^6$ | $2^3$ | $2^0$ |

| 64 | 8 | 1 |
|---|---|---|

FIG.4B

| 4 |
|---|
| 2 |
| 1 |

FIG.6

|   | j | e | a |
|---|---|---|---|
|   | k | f | b |
|   | l | g | c |
|   | m | h | d |

METHOD FOR PERFORMING MORPHIC TRANSFORMATIONS ON IMAGE DATA IN A GENERAL PURPOSE COMPUTER

This application is a continuation, of application Ser. No. 925,333, filed 10/31/86, now abandoned.

BACKGROUND OF THE INVENTION

1. Field of the Invention

This invention relates generally to image processing, and more particularly to a computer program for use with a general purpose computer that increases the efficiency of the general purpose computer as an image processor by reducing the number of memory accesses required.

2. Description of the Prior Art

A morphic transformation is an operation that maps a binary image into another binary image such that each picture element or pixel in the output image is some Boolean function of the corresponding pixel and other pixels in its neighborhood in the input image.

Even when the neighborhood is restricted to a pixel and the eight pixels adjacent to it horizontally, vertically and diagonally (a "3 by 3" or "Moore" neighborhood), morphic transformations are useful for many image processing and analysis operations. For example, Mandeville U.S. patent application Ser. No. 626,552, assigned to the assignee of the present invention, devised a generic method for detecting defects in images of printed circuit patterns that uses morphic transformations extensively.

Morphic transformations are also useful in other computer graphics operations. When applied to an image, morphic transformations permit manipulation of the image. For example, a morphic transformation of a curved line could remove all but the end points of the line. Another example would be use of a morphic transformation to strip away an outer layer of the image of an irregularly shaped object, or perhaps, add to it.

Due to its widespread usefulness, a number of special purpose hardware devices have been built to perform morphic transformations (see for example, Sternberg, U.S. Pat. No. 4,167,728) and Kimmel, U.S. Ser. No. 759,640 filed July 26,1985.

The present invention is a method and algorithm for performing morphic image transformations on a general purpose computer. Its principal advantage is that it runs faster than "conventional" algorithms because it reduces the number of memory accesses and other instructions.

To implement morphic transformations a nine bit convolution of the Moore Neighborhood may be performed. For purposes of explanation, pixel data having a value of 1 or 0, i.e on or off is considered. These techniques, are, however extendable to pixel data containing additional information, for example, color information. The convolution is performed by multiplying (weighting) each bit in the neighborhood by a predetermined amount, and adding the results together. If the predetermined weights are appropriately selected, for example, powers of 2 from 0 to 8, $(2^0, 2^1, \ldots 2^8)$, the results, for each position will be a nine bit word that contains information relevant to the pixels of the Moore Neighborhood. The resulting nine bit word may then be operated on, for example using a look up table, to transform the image as required. Such convolutions require, for a Moore Neighborhood, a minimum of nine accesses to pixel memory to obtain the necessary data to be operated on.

In a general purpose computer, such memory accesses are usually quite slow, and consequently the morphic transformation is slow.

SUMMARY OF THE INVENTION

In a preferred, yet nonetheless illustrative embodiment, the method of the morphic transformation according to the present invention carries out morphic transformations with minimal memory accesses by using a two step convolving sequence to form an intermediate image. The components of the intermediate image are used in a recursive process to provide the desired final convolution. The word resulting from this convolution is then used to access a morphic transformation table in a second memory access for table lookup. The two step convolution requires a total of only four memory accesses. Moreover, in some systems, two accesses to registers are needed which need not come from image memory.

It is thus an object of the invention to perform morphic transformations efficiently, with a minimal number of memory accesses.

A further object of the invention is to perform morphic transformations efficiently on a general purpose computer rather than on specialized image processing hardware.

A feature of the invention is a two step sequence of convolution and table lookup transformation, used recursively to implement morphic transformations.

Another feature of the invention is its extension capability, in that it can be applied to neighborhoods larger than the Moore neighborhood, without any asymptotic increase in execution time.

An advantage of the invention is that it runs faster on a given computer than conventional programs for accomplishing morphic transformations, as a result of its requirement of fewer memory accesses.

Another advantage of the invention is that it efficiently processes bit packed data, in which binary pixels are stored eight per eight bit byte, because input pixels are accessed only once, sequentially.

Yet another advantage of the invention is that the program is efficient when used with image data taken from sequential image memories, because input pixels are accessed strictly sequentially.

These and other objects, features and advantages of the invention will become more apparent upon reference to the attached description of the preferred embodiments and drawings described below.

BRIEF DESCRIPTION OF THE DRAWINGS

FIG. 1 is an example of pixels in an image;

FIG. 2 shows weightings applied in a convolution of an image;

FIGS. 4A and 4B show weightings applied in a two step convolution;

FIG. 6 is an example of the pixels in an image useful for explaining the present invention.

DESCRIPTION OF THE PREFERRED EMBODIMENTS

The method according to the present invention is an algorithm for performing morphic transformations on a general purpose computer more efficiently by reducing the number of memory accesses and other machine operations.

Morphic transformations can often be efficiently implemented (in hardware and software) as a sequence of two operations: (1) convolution and (2) lookup table transformation.

Referring to FIG. 1, for purposes of explanation, image data is shown in a 5×5 array in which each pixel has a value of 1 or 0. The nine central pixels (picture elements) are also labelled a-i. It will be clear to those skilled in the art that large (or smaller) arrays can be used. Arrays of 1024×1024 pixels are, for example, common in computer graphics environments.

Convolution consists of convolving the input image (consisting of two values: 0 and 1) against a kernel of the form shown in FIG. 2. In the step of convolution the kernel shown in FIG. 2 can be considered to be placed over the pixel array of FIG. 1 so that the central member of the array, i.e. the $2^4$ member, is placed over the pixel to be operated on. In this instance the morphic transformation for pixel e is considered. As a result of the convolution a value is derived as follows:

$$256a+128d+64g+32b+16e+8h+4c+2f+i \quad (1)$$

In the example shown a value of:

$$256+128+64+32+16+4=500d=111110100b=1\text{-}F4h \quad (2)$$

is obtained. The value 1F4h is then assigned to the position of pixel e. In like manner, the central value of the kernel can be placed over other pixels in the array to generate 9 bit words for each pixel in the array. In this way each pixel is mapped into a value that contains information about both the pixel and its neighbors.

By proper selection of the values in the kernel of FIG. 2, a maximum number of 511d or 111111111b can be obtained. It will be clear, however, to those of skill in the art that this technique can and has been extended to larger than 3×3 neighborhoods, in which case a word of more than nine bits is required.

The result of this convolution is an "image" consisting of nine bit "pixels"; each bit in each pixel of the image has the value of one of the binary values in the 3 by 3 neighborhood of the corresponding pixel in the input image.

Figure 3:
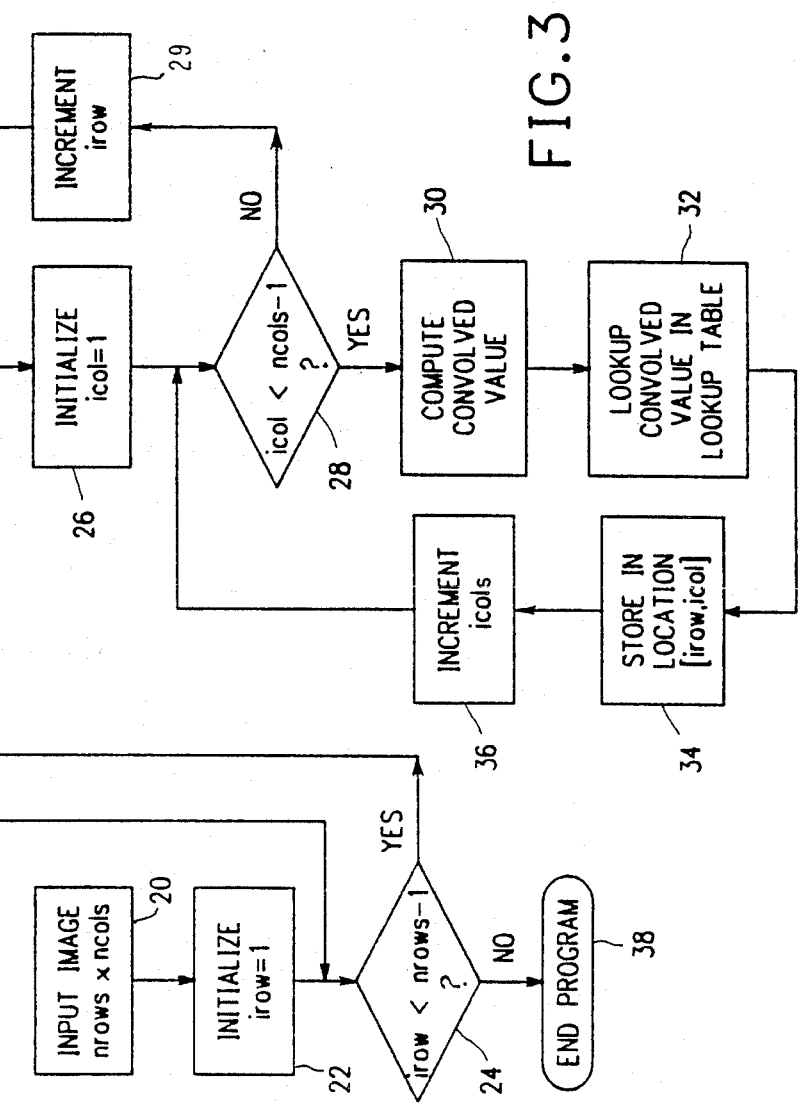
FIG 3 is a flow chart of the naive morphic transformation algorithm.

The second step of lookup table transformation can then be performed. Lookup table transformation consists of using the nine bit value for each pixel in the input image as an index into a table of 512 one bit values that are defined by the specified neighborhood function. The two steps—convolution and lookup table transformation—can be combined into a program that iteratively implements morphic transformations. Such an algorithm is shown in FIG. 3, and as will be explained below requires approximately nine memory accesses to the input image for each pixel.

At the first step 20, an input image having m×n rows and columns (nrows and ncols, respectively), is placed into memory for operation. At step 22, the algorithm is initialized to begin at row 1 (irow=1) for the output image. At step 24 a test is made to determine that the column number of the output location is less than that of the input image column-1. If it is not the transformation is ended at step 38. Otherwise the procedure continues and in like manner initializes the output column number (step 26) and tests to make sure that the output image number is less than the input image column number-1 (step 28). In step 30 the pixel value is convolved in accordance with equation 1 above. Since a total of nine input image pixels are needed to compute the value of the convolution, nine memory accesses are needed.

In step 32, the value computed is used as an index to a lookup table, which returns a one bit value of the transformed image which is stored than as a value for the output image (step 34).

After storage the number icols is incremented by one, and the secondary loop starting at step 28 is begun again until an entire row of the input image is completed. After completion of the row, the row number (irows) is incremented at step 29 and the process is continued until all rows are completed and the procedure terminates (step 38).

The present invention takes advantage of the fact that the convolution is separable into two parts. The convolution of the 3×3 neighborhood can be performed in two parts as described in the following. In the first part a horizontal array having the elements 64, 8, 1 shown in FIG. 4A, is multiplied by the pixel elements such that the central element of the array [8] is multiplied by the 3 pixels in the column of the pixel of interest, for example the pixel e of FIG. 1 and the pixels to the left and right are multiplied by 64 and 1 respectively. The results of the multiplications are then summed. The calcuation is also made for the remaining two rows in the 3×3 neighborhood. For the array of FIG. 1 this results in intermediate sums of 73, 72 and 64. These sums are then multiplied by a vertical array of 4, 2 and 1, shown in FIG. 4B, and the results added together to obtain 292+144+64=500, which is the same result previously obtained. Simple arithmetic will verify that separating the convolution in this manner yields the same weightings as provided by the array of FIG. 2.

In the present invention a separated convolution is used in a recursive method to obtain a morphic transformation requiring only four memory memory accesses.

Figure 5A:
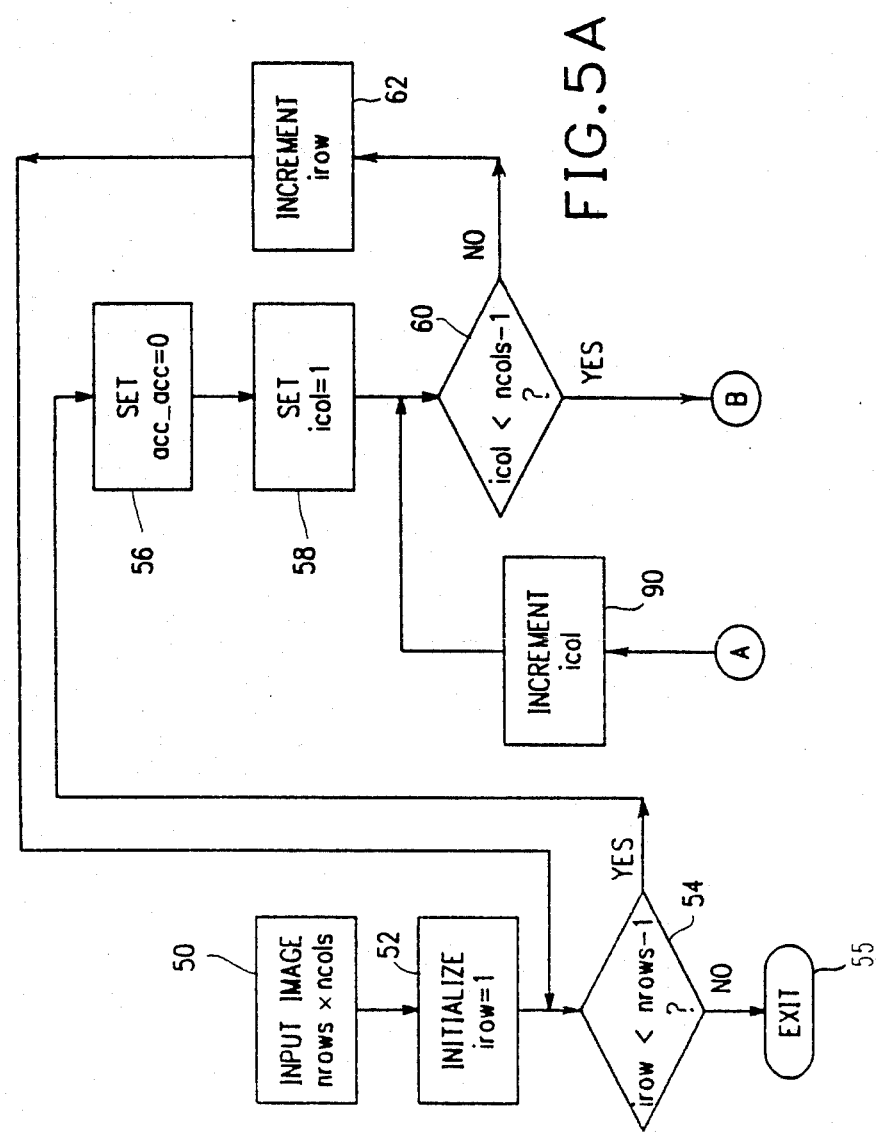
FIGS. 5A and 5B show a flowchart useful in explaining the method according to the present invention.
Figure 5B:
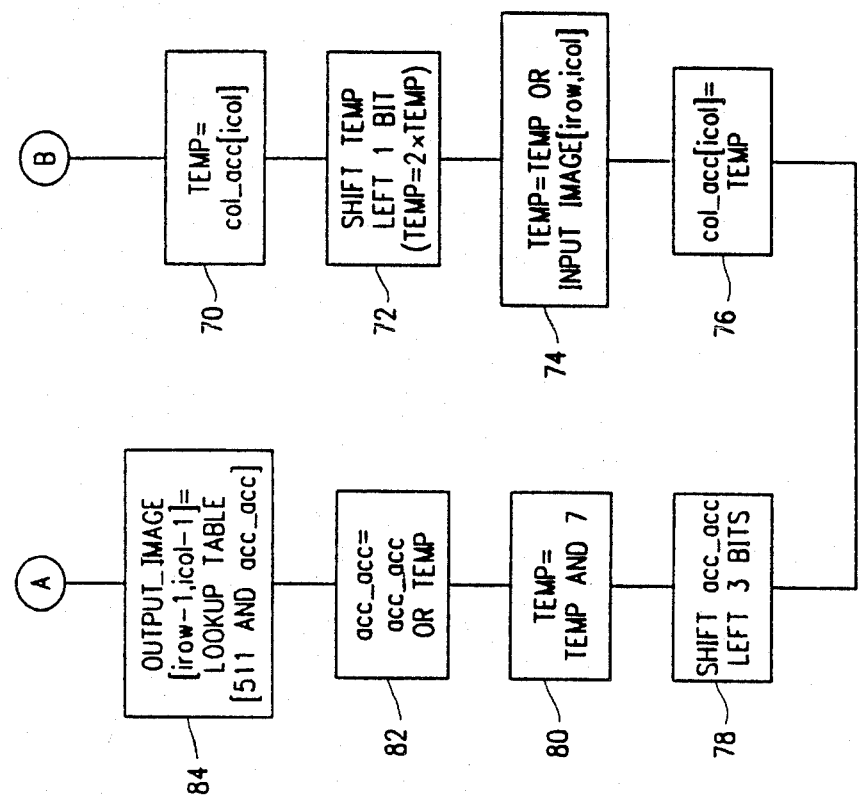

Refer now to the flow charts of FIGS. 5A and 5b. At step 50 the input image is accessed from memory. For purposes of this discussion the input image is considered to be an array having dimensions of nrows by ncols and referred to as the variable input_image[nrows,ncols]. It should be noted that the value of nrows need not equal the value of ncols.

At step 52 the row index, irow, is initialized to equal 1. Next, at step 54, an outer loop begins in which the value of irow is compared to nrows-1. If it is greater than nrows-1, the program terminates at step 55. This loop determines the row of the image element being processed. If not, execution continues by setting ac-c_acc equal to 0 and the column index, icol equal to 1 at steps 56 and 58 respectively. Thus the algorithm begins operation at position 1,1 of the input image.

At step 60 an inner loop begins to determine the column of the image element to be processed. Should icol be greater than or equal to ncols-1 the inner loop is exited and the row count is incremented by one at step 62. Otherwise program execution continues at step 70.

At step 70 a temporary or intermediate variable named TEMP is set equal to the value col_acc[icol]. The variable col_acc is a linear array, containing elements each representative of a selected number of bits in each column. The index icol selects which element of the array is being considered. Initially, the value of col_acc may be arbitrarily set since it represents transformations on a neighborhood that runs outside the boundary of the input image. This may be better understood by referring to FIG. 6 which shows a 4×3 region of the input image for purposes of discussion. The values a-j represent single bit binary values (e.g. 1 or 0). Using the example of FIG. 6, it will be assumed that processing has already been performed for the first three rows and columns and that we are now considering the lower right hand pixel having a value d. Thus col_acc will have previously been assigned a value of abcX and at step 70, TEMP will also be set equal abcX, where X is a "don't care" value.

The value of TEMP is left shifted 1 bit (or multiplied by 2) at step 72. This is equivalent to multiplying TEMP by two. It will be recalled that when the convolution has been separated into two parts, that one part consisted of multiplying the various image pixels by 1, 2, and 4. This is partially accomplished in this step. Since the algorithm is recursive, subsequent multiplication by two will accomplish multiplication by 4. In the present example TEMP now becomes equal to abc0. This new value of TEMP is then ORed with input_image(irow,icol) at step 74. Since both irow and icol are equal to 1, the value of the input image under consideration is d, and therefore TEMP equals abcd.

Next, col_acc[icol] is set equal to the new value of TEMP at step 76. Then at step 78 $acc_{13}acc$ is left shifted 3 bits. This is equivalent to multiplying $acc_{13}acc$ by 8, but is a much faster operation in most computers. It will also be recalled that when the convolution has been separated into two parts, that one part consisted of multiplying the various image pixels by 1, 8, and 64. This is partially accomplished in this step. Since the algorithm is recursive, subsequent multiplication by eight will accomplish multiplication by 64.

For purposes of explanation, the assumption that processing for the first three rows and columns has already been performed remains and that previous iterations of the algorithm had brought $acc_{13}acc$ to a value of XXXklmfgh. It now becomes equal to XXXklmfgh000.

In step 80 the value of TEMP is replaced with TEMP ANDed with 7d (0111b). Recall that TEMP was previously set equal to abcd and thus now equals 0bcd. Next, in step 82, the value of $acc_{13}acc$ is set equal to $acc_{13}acc$ ORed with TEMP. The OR process is equivalent to a binary addition, but in general is a faster operation. Thus, in accordance with the previous example, $acc_{13}acc$ takes on a new value of XXXklmfghbcd.

At step 84 the value of the output image for the location under consideration is set equal to a value held in a lookup table. The lookup table is a linear array having 512 elements, and is used to provide an output value in accordance with the index value. The index value is found by ANDing 511d (111111111b) with $acc_{13}acc$ which in the present example returns a value of klmfghbcd. In other words, ANDing by 511 strips off all but the low order 9 bits.

Execution continues at step 90 where the column index, icol, is incremented by 1. This process will continue until each column in a row is operated on, and then the row number is incremented. Execution continues until all pixel elements in all columns and rows have been operated on, after which the program terminates at step 80.

The principal advantage of this algorithm is that it minimizes the number of memory accesses: for each pixel in the input and output image, there are two reads and two writes (assuming $acc_{13}acc$ is kept in a register) versus nine reads and one write for the "naive" algorithm. In particular, each pixel in the input image is read exactly once, resulting in a faster morphic transformation since fewer accesses take less time.

Memory accesses in the present invention occur at steps 70, 74, 76 and 84. In all other operations, the data and variables will, such as TEMP and $acc_{13}acc$, by design, remain in registers, such as an accumulator, which allows for very fast access.

Furthermore, the intermediate variable, col_acc can be stored in a fast memory, such as a cache. Accordingly, processing speed can be increased even further over that of the prior art algorithm.

A version of this algorithm written in the programming language C was compared with the "naive" version described with respect to FIG. 3, also written in C that accessed each pixel nine times. The proposed algorithm ran twice as fast, both on an IBM 3081 and on an IBM PC/XT.

The algorithm according to the present invention uses extra storage in addition to the input and output images (acc_acc, and the col_acc array). Note, however, that only the low order two bits of each entry of col_acc and the low order six bits of acc_acc are read-accessed in the inner loop. As such, the total number of bits of temporary storage required is approximately 2× ncols. Hardware implementations of morphic transformations typically require two delay lines, each containing one row (i.e., 2× ncols) binary pixels, which is essentially equivalent to the temporary storage used by the present invention.

The algorithm according to the present invention can be straightforwardly extended from a 3×3 neighborhood to an h-row by w-column neighborhood. The algorithm of FIGS. 5A and 5B are modified as follows to achieve this extension. In step 78 acc—acc must be shifted by the value h in place of three, in step 80, TEMP should be ANDED with $2^h-1$ instead of 7, and in step 84 acc$_{13}$ acc should be ANDed with $2^{hw}-1$ instead of 511.

In practice, this extension is limited by the fact that the lookup table must contain $2^{hw}$ entries. Thus, while h=w=4 is reasonable in terms of memory requirements ($2^{hw}$=64K), h=w=5 ($2^{hw}$=32M) may not be.

While the invention has been described with reference to a preferred embodiment, it will be understood by those skilled in the art that various changes in form and details may be made without departing from the scope of the invention.

What is claimed is:

1. A method for use in a general purpose computer, for transforming an input image into an output image using a morphic transformation on image data comprised of pixels, said general purpose computer having a memory, said method comprising the steps of:

storing original pixels of said input image in said memory, said original pixels being addressed by at least first and second indexes;

mapping each of said original pixels in memory into an image of transformed pixels wherein each transformed pixel contains data representing an original pixel and neighboring pixels in a predefined neighborhood wherein, said mapping comprises;

accumulating said original pixels accessed according to said first index to provide first accumulated values and storing said first accumulated values in said memory;

shifting said first accumulated value stored in said memory by two and replacing said first accumulated value stored in said memory with said value shifted by two to provide a first replaced accumulated value;

ORing said value of said original pixel with said first replaced accumulated value to provide a first ORred accumulated value and replacing said first accumulated value with said first ORred accumulated value in said memory;

accumulating said original pixels accessed according to said second index to provide second accumulated values and storing said second accumulated values in said memory;

shifting said second accumulated values a second predetermined number of bits to provide a shifted second accumulated value; and ORing said first ORred accumulated value in said memory to said second accumulated value to provide a second added accumulated value and replacing said value in said memory with said second added accumulated value;

searching a lookup table using said second added accumulated value as an index and storing a value pointed to in said lookup table by said index in an output array in said memory; and repeating said steps of mapping and searching for each of said original pixels; and providing an output image having pixels corresponding to values in said output array, thereby requiring only four accesses to said memory to determine said morphic transformation.

2. The method according to claim 1 wherein said said original pels are addressed by first and second indices and said transformation is performed on an h by w neighborhood of said two dimensional array of data, h being aligned with said first index and w being aligned with said second index, wherein said first predetermined number is equal to 2h.

3. The method according to claim 2 further comprising the step of retaining only $2^h-1$ least significant bits of said values stored in said temporary memory.

4. The method according to claim 3 further comprising the step of retaining only $2^{hw}-1$ least significant bits of said second added accumulated value prior to its use as an index.

5. The method according to claim 4 wherein the step of retaining only said $2^h-1$ least significant bits comprises ANDing said value in temporary memory multiplied by two, with $2^h-1$.

6. The method according to claim 5 wherein the step of retaining only said $2^{hw}-1$ least significant bits of said second added accumulated value comprises ANDing said second added accumulated value with $2^{hw}-1$.

7. The method according to claim 6 wherein said neighborhood is the Moore neighborhood and h and w equal 3.

* * * * *